Patented Sept. 4, 1923.

1,467,030

UNITED STATES PATENT OFFICE.

VICTOR C. EDWARDS, OF ARLINGTON, NEW JERSEY, ASSIGNOR TO E. I. DU PONT DE NEMOURS & COMPANY, OF WILMINGTON, DELAWARE, A CORPORATION OF DELAWARE.

REENFORCED GLASS.

No Drawing.   Application filed April 6, 1922. Serial No. 550,183.

*To all whom it may concern:*

Be it known that I, VICTOR C. EDWARDS, a citizen of the United States, and a resident of Arlington, in the county of Hudson and State of New Jersey, have invented a certain new and useful Reenforced Glass, of which the following is a specification.

This invention relates to glass sheets which have been strengthened by applying thereto a layer of a transparent plastic material such as pyroxylin (known under such trade names as pyralin, celluloid, etc.), and comprises, as a new article of manufacture, the combination, with a plastic layer of this kind, of a glass of special composition adapted to absorb the principal actinic rays of light.

Many methods have been proposed and patented for reinforcing sheet glass with pyroxylin. Such products are manufactured usually by sandwiching a sheet of plastic between two sheets of window glass using pressure, heat, and generally an adhesive, so that in the finished product both sheets of glass adhere so tightly to the plastic that if the glass is struck a blow it will not come apart and scatter, even though the glass may be cracked into many pieces. Such reenforced glass has found extensive use in goggles, aeroplane windshields, automobile windshields, closed automobile windows, bullet-proof partitions in banks, etc.

The use of such reenforced glass as a colorless transparent window is as yet comparatively limited, chiefly for the reason that the strengthening layer of plastic material frequently becomes colored or discolored in the course of time, indicating deterioration, of which further evidence is the development of brittleness and of acidity therein. So far as is known it is not possible, and in any case not practicable, to so alter the composition of the plastic layer as to avoid this development of color.

I have now discovered that the objectionable coloration of the plastic material may be prevented by using, in place of the ordinary window glass or plate glass heretofore employed, a special glass of such a nature that it will not transmit the actinic rays of light, or at least the more powerful actinic rays such as the ultra-violet. I was led to this solution of the problem through the observation that the development of color in plastics made from cellulose esters such as cellulose nitrate and cellulose acetate, is greatly accelerated by exposure of the plastics to direct sunlight.

As is known to those versed in the science of physics, sunlight is a mixture of rays of red, orange, yellow, green, blue and violet light. The phenomena of light are explained in terms of energy waves which pervade all space. The waves of red light are comparatively long, those of orange light shorter, those of yellow light shorter still, those of green, blue and violet being progressively shorter in the order named. Accompanying sunlight always there are energy waves shorter than those of violet light. These shortest waves are not recognized by the eye as light, but are very powerful in producing or accelerating chemical reactions in many substances with which they come in contact. These waves shorter than violet light waves are called ultra violet waves or ultra-violet rays, and are by far the most powerful of the actinic rays in inducing certain chemical reactions. The green, blue, and violet rays, although quite strongly actinic with respect to certain sensitive substances such as the silver bromide of a photographic film, are relatively inert with respect to compounds such as cellulose nitrate.

I have found that it is these strongly actinic, or ultra-violet rays, that are the principal cause of development of color, of brittleness, and of acidity in plastic such as pyralin when exposed to sunlight. When these ultra-violet or actinic rays are screened out or absorbed by passing the sunlight through glass of special composition, the remaining sunlight produces little or no change in, or development of, color, development of brittleness, or development of acidity in plastics such as pyralin. A fundamental action of ultra-violet or actinic rays is to cause decomposition of the cellulose esters, such as cellulose nitrate or cellulose acetate, contained in the plastics. Certain dyestuffs are also decomposed by the action of ultra-violet or actinic rays. Ordinary window glass transmits most of the actinic or ultra-violet rays; such glass affords slight, but inadequate, protection.

Where the glass or the plastic layer is purposely colored, the use of a special glass in accordance with my invention will prevent the objectionable change in color which ordinarily occurs when ordinary glass is used.

Glass compositions having the opacity to ultra-violet rays that is required by my invention are already well known and are available in various forms as articles of commerce. Three examples of suitable glass compositions are given as follows:

A soda glass flux is preferably separately prepared by fusing together the following ingredients:

| | |
|---|---|
| Sand ($SiO_2$) | 61.00% |
| Sodium carbonate, anhydrous | 25.50 |
| Sodium nitrate, recrystallized | 5.00 |
| Calcium carbonate, precipitated | 7.20 |
| Borax | 0.75 |
| Arsenic trioxide | 0.55 |
| Total | 100.00% |

This composition, which may be designated "soda glass flux A," is fused with certain salts or oxides in certain proportions as hereinafter indicated, to produce the desired glass composition.

Example I.

| | |
|---|---|
| Soda glass flux A | 83.00% |
| Cerium nitrate, crystallized | 17.00 |
| Total | 100.00% |

Example II.

| | |
|---|---|
| Soda glass flux A | 90.00 |
| Cerium borate | 8.13 |
| Nickel sulphate, crystallized | 0.07 |
| Uranoso-uranic oxide | 1.80 |
| Total | 100.00% |

Example III.

| | |
|---|---|
| Soda glass flux A | 92.00% |
| Ferrous sulphate, crystallized | 8.00 |
| Total | 100.00% |

Glasses approximately equal in ultimate composition to those described above, and of equal value may be made by fusing at once all the raw materials rather than making the soda glass flux and then fusing this with the salts and oxides which are used to impart special qualities. Furthermore, the chemical elements of the raw materials used in each of the above-described glasses might be added in combinations other than those described, so that the same ultimate composition would be approximated when all the raw materials had reacted upon each other chemically in the fused mass.

Glasses containing the same chemical elements as the above, but in different proportions would undoubtedly be useful. Glasses containing chemical elements not included in the above have been developed and found useful for absorbing ultra-violet rays.

The above examples of suitable glass compositions are merely illustrative; any other glass composition which is transparent with respect to one or more of the ordinarily non-actinic light rays, but is capable of absorbing ultra-violet rays, comes within the purview of my invention.

My invention is not limited to a reenforced glass comprising a reenforcing layer containing proxylin or some other cellulose ester, but includes any reenforced glass made in part of a plastic reenforcing layer containing a substance which tends to acquire a color or to become discolored when exposed to the actinic rays of sunlight.

A suitable reenforced sheet of glass may be made by inserting a sheet of transparent pyralin between two sheets of glass having the above-mentioned properties, the glass being caused to adhere firmly to the pyralin by the use of a suitable cement, and by the application of hydraulic pressure. In certain cases, however, as where the composite glass will be so located that the light containing actinic rays will enter the glass from one side only, one of the two sheets of glass may be dispensed with or may be composed of ordinary glass. The sheet of pyralin may advantageously consist of pyroxlyn and a softener such as camphor.

As will be understood, my invention is not concerned with any particular method of bringing together the several elements of the composite reenforced glass article, but comprises broadly the combination of a reenforcing layer of plastic material which tends to change color, that is, to become colored or discolored, when subjected to the action of ultra-violet, or actinic, rays, with one or more sheets of a special glass capable of absorbing such ultra-violet, or actinic, rays, to form a laminated structure with the plastic material firmly adherent to the sheet or sheets of glass.

I claim:

1. As a new article of manufacture, a reenforced glass structure comprising the combination of a layer of plastic material which tends to change color when exposed to ultra-violet, or actinic, rays of light, with a sheet of glass capable of absorbing such ultra-violet, or actinic, rays.

2. As a new article of manufacture, a reenforced glass structure comprising the combination of a transparent sheet of a pyroxylin composition with a transparent sheet of glass capable of absorbing those actinic rays of light which tend to induce an appreciable color change in said pyroxylin composition.

3. As a new article of manufacture, a reenforced glass structure comprising a layer of a transparent pyroxylin composition each side of which is firmly attached to a sheet of transparent glass, at least one of said sheets of glass being capable of absorbing those actinic rays of light which tend to induce an appreciable color change in said pyroxylin composition.

4. As a new article of manufacture, a reenforced glass structure comprising a layer of a substantially colorless, transparent pyroxyline composition each side of which is firmly attached to a sheet of substantially colorless, transparent glass, at least one of said sheets of glass being capable of absorbing those actinic rays of light which tend to induce an appreciable development of color in said pyroxylin composition.

5. As a new article of manufacture, a reenforced glass structure comprising the combination of a transparent sheet of a cellulose ester composition with a transparent sheet of glass capable of absorbing those actinic rays of light which tend to induce an appreciable color change in said cellulose ester composition.

In testimony whereof I affix my signature.

VICTOR C. EDWARDS.